(12) United States Patent
Miyamoto et al.

(10) Patent No.: US 11,577,720 B2
(45) Date of Patent: Feb. 14, 2023

(54) COLLISION AVOIDANCE ASSIST APPARATUS

(71) Applicant: TOYOTA JIDOSHA KABUSHIKI KAISHA, Toyota (JP)

(72) Inventors: Yuhei Miyamoto, Toyota (JP); Kohei Morotomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 278 days.

(21) Appl. No.: 16/935,704

(22) Filed: Jul. 22, 2020

(65) Prior Publication Data

US 2021/0024059 A1 Jan. 28, 2021

(30) Foreign Application Priority Data

Jul. 25, 2019 (JP) .............................. JP2019-136814

(51) Int. Cl.
*B60W 30/09* (2012.01)
*B60W 30/095* (2012.01)
*B60W 10/20* (2006.01)
*B60W 10/18* (2012.01)

(52) U.S. Cl.
CPC ............ *B60W 30/09* (2013.01); *B60W 10/20* (2013.01); *B60W 30/095* (2013.01); *B60W 10/18* (2013.01); *B60W 2420/42* (2013.01); *B60W 2420/52* (2013.01); *B60W 2552/00* (2020.02)

(58) Field of Classification Search
CPC .... B60W 30/09; B60W 10/20; B60W 30/095; B60W 10/18; B60W 2420/42; B60W 2420/52; B60W 2552/00; B60W 2552/53; B60W 2554/802; B60W 2554/804; B60W 2554/805; B60W 10/184; B60W 30/08–0956
See application file for complete search history.

(56) References Cited

U.S. PATENT DOCUMENTS

| | | |
|---|---|---|
| 9,105,190 B2 | 8/2015 | Akiyama |
| 9,393,960 B2 | 7/2016 | Kodaira |
| 9,405,727 B2 | 8/2016 | Nagata |
| 9,483,945 B2 | 11/2016 | Okita et al. |
| 9,669,760 B2 | 6/2017 | Hanita et al. |
| 9,873,412 B2 | 1/2018 | Moriizumi |

(Continued)

FOREIGN PATENT DOCUMENTS

| | | |
|---|---|---|
| JP | 2017-043262 A | 3/2017 |
| JP | 2019-40279 A | 3/2019 |

*Primary Examiner* — Russell Frejd
*Assistant Examiner* — Ana D Thomas
(74) *Attorney, Agent, or Firm* — Sughrue Mion, PLLC

(57) ABSTRACT

A driving assist ECU determines that a current situation is a specific situation where it is predicted that there is no object that is about to enter an adjacent lane from an area outside of a host vehicle road on which a host vehicle is traveling, when a road-side object is detected at a part around an edge of the adjacent lane, and/or when a white line painted to define the adjacent lane is detected at the part around the edge of the adjacent lane and no object near the detected white line is detected. The driving assist ECU does not perform a steering control for avoiding a collision, the steering control for letting the vehicle enter the adjacent lane, when it is not determined that the current situation is the specific situation.

8 Claims, 10 Drawing Sheets

Embodiment

(56) References Cited

U.S. PATENT DOCUMENTS

| | | | |
|---|---|---|---|
| 9,898,929 | B2 | 2/2018 | Harada et al. |
| 9,965,955 | B2 | 5/2018 | Fujishiro |
| 10,793,147 | B2 | 10/2020 | Kaminade et al. |
| 10,946,830 | B2 | 3/2021 | Sawai et al. |
| 11,175,673 | B2 | 11/2021 | Eshima |
| 2017/0057498 | A1 | 3/2017 | Katoh |
| 2019/0299981 | A1* | 10/2019 | Yoon ..................... G05D 1/021 |
| 2019/0315345 | A1* | 10/2019 | Newman ............... B60W 50/14 |
| 2021/0394752 | A1* | 12/2021 | Satoh ................... B60W 30/09 |

* cited by examiner

COLLISION AVOIDANCE ASSIST APPARATUS

TECHNICAL FIELD

The present disclosure relates to a collision avoidance assist control apparatus configured to avoid a collision between a host vehicle and an obstacle by autonomous steering.

BACKGROUND

There has been a known collision avoidance assist apparatus configured to:

detect an obstacle having a high possibility (collision possibility) of a collision with a host vehicle, using a forward obstacle detection sensor such as a camera sensor and a radar sensor;

issue an alert to a driver when the obstacle having the high collision possibility is detected; and brake the host vehicle autonomously when the collision possibility becomes higher, so as to assist the driver to avoid the collision.

The collision avoidance assist apparatus proposed in Japanese Patent Application Laid-Open (kokai) No. 2017-43262 is configured to perform autonomous steering to change a moving direction of the host vehicle to a direction allowing the host vehicle to avoid the collision with the obstacle when the collision possibility remains high even after the host vehicle starts to be braked.

SUMMARY

In order to perform the autonomous steering to circumvent an obstacle, there must be a space (referred to as a "collision avoidance space") to which the host vehicle moves.

For instance, the proposed collision avoidance assist apparatus is configured to:

determine whether or not a collision avoidance route/path is present (or exists) in a host vehicle lane that is a lane in which the host vehicle is running, the collision avoidance route being a route along which the host vehicle can move in order to avoid the collision; and perform the steering control to let the host vehicle move along the collision avoidance route, only when it is determined that the collision avoidance route is present in the host vehicle lane.

Meanwhile, there may be a case where a collision avoidance space is present in a lane (hereinafter, referred to as an "adjacent lane") adjacent to the host vehicle lane, even if the collision avoidance space cannot be found within the host vehicle lane. In such a case, letting the host vehicle run along a collision avoidance route leading to the collision avoidance space existing in the adjacent lane can avoid the collision, even if the host vehicle deviates from the host vehicle lane. This can increase operation scenes where the autonomous steering can be performed to avoid the collision.

In order to carry out the above autonomous steering in more scenes, it is preferable to further employ additional sensors so as to detect objects that are present in a wider area ahead (in front) of the host vehicle. Meanwhile, a vehicle employing systems for performing driving assists typically has a front direction (or forward) camera sensor and a front direction (or forward) radar sensor. However, such sensors are not sufficient for detecting the objects that are present in the wider area ahead of the host vehicle. Thus, additional sensors (e.g., front side direction radar sensors) may be required. For instance, the front side direction radar sensors are arranged at a right front corner of a vehicle body and a left front corner of the vehicle body, respectively. A center axis of radar wave emitted from each of the front side direction radar sensors is along diagonally forward outside direction. This configuration can enlarge a detection area up to a lateral direction of the host vehicle, and can recognize a movement of an object in the wider detection area.

However, the above configuration having the additional sensors requires a high cost and a long time in developing a system that can recognize/detect the object accurately. In addition, the above configuration may require a lot of memory capacity and increase a calculation load.

The present disclosure is achieved to solve the problems described above. One of objects of the present disclosure is to provide a collision avoidance apparatus having a simple configuration that can let the vehicle deviate from the host vehicle lane to avoid the collision with assuring the safety, when necessary.

In some embodiments of the present disclosure, a collision avoidance assist apparatus for a vehicle (i.e., host vehicle) comprising:

a front direction camera sensor (11) configured to take a picture of a front direction camera detection area to obtain front direction camera sensor information, the front direction camera detection area being an area between a diagonally forward left direction of the vehicle and a diagonally forward right direction of the vehicle;

a front direction radar sensor (12) configured to obtain front direction radar sensor information that is information on an object that is present in a front direction radar detection area, the front direction radar detection area being an area between a diagonally forward left direction of the vehicle and a diagonally forward right direction of the vehicle; and a control unit (10) configured to perform a collision avoidance steering control, based on at least said front direction camera sensor information, to let said vehicle move to a collision avoidance space in order to avoid a collision between said vehicle and an obstacle (S19), when it is determined, based on at least said front direction radar sensor information, that an object is present, as said obstacle, that is highly likely to collide with said vehicle, wherein, the control unit is configured to:

determine, based on the front direction camera sensor information and the front direction radar sensor information, whether or not a first condition is satisfied, the first condition being a condition that is satisfied when it is determined that there is a specific space as the collision avoidance space, the specific space overlapping with an adjacent lane that is adjacent to a host vehicle lane in which the vehicle is traveling (S13);

determine, based on surrounding information on a part around an edge of the adjacent lane on an opposite side from the host vehicle lane, the surrounding information being included in the front direction camera sensor information and/or the front direction radar sensor information, whether or not a second condition is satisfied, the second condition being a condition that is satisfied when a current situation is a predetermined specific situation where it is predicted that there is no object that is about to enter the adjacent lane from an area outside of a host vehicle road that is a road on which the host vehicle is traveling (S14-S16), and perform the collision avoidance steering control to let the vehicle move to the specific space when it is determined that an execution permit condition is satisfied, the execution permit condition being a condition that is satisfied when at least the first condition and the second condition are both determined to be satisfied (S19).

In some embodiments of the present disclosure, a collision avoidance assist apparatus for a host vehicle comprising:

front direction detection means (11, 12) configured to detect a three dimensional object and a white line (road marking line painted on a road) in an area in front of the host vehicle and between a diagonally forward left direction of the host vehicle and a diagonally forward right direction of the host vehicle; and collision avoidance steering control means (10, S19) for performing a collision avoidance steering control being a control to avoid a collision between the host vehicle and an obstacle by letting the host vehicle deviating from a host vehicle lane that is a lane in which the host vehicle is traveling to an adjacent lane that is a lane adjacent to the host vehicle lane, when the obstacle having a high possibility of colliding with the host vehicle is detected based on detected information by the front direction detection means.

The collision avoidance steering control means includes:

avoidance space determination means for determining whether or not a collision avoidance space is present (exists) that lets the host vehicle enter the adjacent lane, based on detected information by the front direction detection means (S13); and specific situation determination means for determining whether or not a current situation is a predetermined specific situation where it is predicted, based on a surrounding information on a part around an edge of the adjacent lane on the opposite side from the host vehicle lane. that there is no movable object that is about to enter the adjacent lane from an area outside of a host vehicle road that is a road on which the host vehicle is traveling (S14-S16).

In addition, the collision avoidance steering control means is configured to determine that an execution permit condition for performing the collision avoidance steering control is satisfied at least when the collision avoidance space is determined to be present by the avoidance space determination means and the current situation is determined to be the predetermined specific situation by the specific situation determination means.

In the above embodiment, the front direction detection means detects a three dimensional object and a white line (road marking line painted on a road), both in the area (i.e., front detection area) in front of the host vehicle and between the diagonally forward left direction of the host vehicle and the diagonally forward right direction of the host vehicle. The front direction detection means may include the front direction camera sensor. The collision avoidance steering control means (or the control unit) carries out the collision avoidance steering control to avoid a collision between the host vehicle and the obstacle by letting the host vehicle deviating from the host vehicle lane, when the obstacle having a high possibility of colliding with the host vehicle is detected based on the information detected by the front direction detection means.

When performing the above collision avoidance steering control, it is necessary to assure that there will be no collision (second collision) between the host vehicle and the other object (different from the obstacle). In view of this, the collision avoidance steering control means includes the avoidance space determination means and the specific situation determination means. The avoidance space determination means determines whether or not the collision avoidance space is present (exists) based on the detected information by the front direction detection means. If the host vehicle is made to enter (move to) the collision avoidance space, at least a part of the host vehicle enters the adjacent lane.

Meanwhile, the detection area of the front direction detection means is limited to an area having a relatively narrow detection angle. Namely, the detection areas of the front direction camera sensor and the front direction radar sensor are between the respective diagonally forward left directions of the host vehicle and the respective diagonally forward right directions of the host vehicle. Thus, a movement of an object present in an area on sides of the host vehicle may not be easily detected. However, even if the detection area of the front direction detection means is not sufficiently wide, there may be a case where it can be predicted/determined that there is no movable object that will (or is about to) enter the adjacent lane from the area outside of the host vehicle road, using the surrounding information on the part around the edge of the adjacent lane on the opposite side from the host vehicle lane obtained by the front direction detection means.

In view of the above, the specific situation determination means determines whether or not a current situation is the predetermined specific situation where it is predicted that there is no movable object that is about to enter the adjacent lane from an area outside of the host vehicle road based on the surrounding information on the part around the edge of the adjacent lane on the opposite side from the host vehicle lane, the surrounding information being included in the detected information by the front direction detection means. The surrounding information may preferably be obtained by the front direction camera sensor. The specific situation is representing a situation of an area in the vicinity of the collision avoidance space.

The execution permit condition for performing the collision avoidance steering control is satisfied at least when the collision avoidance space is determined to be present by the avoidance space determination means and the current situation is determined to be the predetermined specific situation by the specific situation determination means. Therefore, when the collision avoidance space is not determined to be present, the collision avoidance steering control is not performed (or is prohibited). When the current situation is not determined to be the predetermined specific situation, the collision avoidance steering control is also not performed (or is prohibited). Accordingly, the collision avoidance apparatus of the present disclosure has a simple configuration and can let the vehicle deviate from the host vehicle lane to avoid the collision with assuring the safety, when necessary.

In some embodiments, the control unit is configured to determine that the current situation is the predetermined specific situation when it is determined, based on the surrounding information, that a road-side object that prevents a movable object from entering the adjacent lane from the area outside of the host vehicle road is present at the part around the edge of the adjacent lane (S14).

For example, the road-side object may be shrubberies, guard rails, or the like. When the road-side object is detected (or is present), a movable object cannot enter the adjacent lane from the area outside of the host vehicle road. In view of the above, in some embodiments, specific situation is defined as a situation where the road-side object at the part around (or in the vicinity of) the edge of the adjacent lane is detected, the road side object preventing the movable object from entering the adjacent lane from the area outside of the host vehicle road.

In some embodiments, the control unit is configured to determine that the current situation is the predetermined specific situation when it is determined, based on the surrounding information, that a road marking line (e.g. white line) painted (on the host vehicle road) to define the adjacent lane is detected at the part around the edge of the adjacent lane and that no object near the detected road marking line is detected (S15: Yes, S16: Yes).

When the road marking line (e.g. white line) is painted/formed at the edge of the host vehicle road on which the host vehicle is traveling, it is unlikely that an object (e.g., the other vehicle) suddenly enters the host vehicle road. However, for instance, the other vehicle may enter the host vehicle road from the other road that joins the host vehicle road. If the road marking line (e.g. white line) is (continuously) painted/formed at the edge of the host vehicle road (i.e., the joining part between the other road and the host vehicle road), the other vehicle is expected to stop tentatively behind the road marking line. Thus, if the other vehicle is not detected in the vicinity of the road marking line (e.g. white line), the host vehicle can move to the adjacent lane safely. In view of the above, in some embodiments, the predetermined specific situation is defined as a situation where it is determined that a road marking line (e.g. white line) painted (on the host vehicle road) to define the adjacent lane is detected at the part around the edge of the adjacent lane and it is also determined that no object near the detected road marking line is detected.

In some embodiments, the control unit is configured to determine that the current situation is the predetermined specific situation, when it is determined, based on the surrounding information, that a road marking line painted on the host vehicle road to define the adjacent lane is detected at the part around the edge of the adjacent lane and that no object near the detected road marking line is detected (S15: Yes, S16: Yes), even when it is not determined that the road-side object is present at the part around the edge of the adjacent lane (S14: No).

In some embodiments, the control unit is configured to firstly determine whether or not a current situation is a situation where the road-side object is detected at the part around the edge of the adjacent lane, and determine that the current situation is the specific situation when the road-side object is detected at the part around the edge of the adjacent lane. In addition, even if the road-side object is not detected at the part around the edge of the adjacent lane, the control unit is configured to determine that the current situation is the specific situation when the current situation is a situation where the road marking line is detected at the part around the edge of the adjacent lane and no object near the detected road marking line is detected. Accordingly, scenes where the collision avoidance assist using the autonomous steering is carried out are increased.

In some embodiments, a rear side direction radar sensor (51R, 51L) configured to detect a target object that is approaching the vehicle in the adjacent lane from an area behind the vehicle is added. In other words, behind vehicle detection means for detecting a behind vehicle that is approaching the vehicle from an area behind the vehicle is added (50, 51R, 51L).

The control unit is configured to determine that the execution permit condition is satisfied, when a third condition is satisfied (S17: Yes) in addition to the first condition (S13: Yes) and the second condition (S14: Yes, S16: Yes), the third condition being a condition that is satisfied when the target object (e.g., behind vehicle) is not detected by the rear side direction radar sensor. In other words, the collision avoidance steering control is carried out when at least the first to third conditions are satisfied.

In the above configuration, the rear side direction radar sensor or the behind vehicle detection means is configured to detect a target object (the other vehicle which is the behind vehicle following the host vehicle from the rear area of the host vehicle) that is running on the adjacent lane and is approaching the host vehicle from the area behind the host vehicle. A part of a known blind spot monitoring/monitor system as one of the driving assist systems may be utilized for the behind vehicle detection means. The blind spot monitoring system is a system that notifies the driver of a presence of an other vehicle that is present within a blind spot of the driver and/or of a presence of an other vehicle that is predicted/expected to enter the blind spot of the driver.

When performing the collision avoidance steering control, it is necessary to watch out for an other vehicle that is approaching the host vehicle from the area behind the host vehicle. In view of the above, the control unit (or the collision avoidance steering control means) affirms the following first to third conditions before performing the collision avoidance steering control.

The first condition is satisfied when the collision avoidance space is determined to be present (exist) (by the avoidance space determination means).

The second condition is satisfied when the current situation is determined to be the predetermined specific situation (by the specific situation determination means).

The second condition is satisfied when no target object (the other vehicle behind the host vehicle) that is approaching the host vehicle from the area behind the host vehicle is detected (by the behind vehicle detection means).

Accordingly, the collision avoidance steering control can be carried out more safely.

Notably, in the above description, in order to facilitate understanding of the present disclosure, the constituent elements or the like of the disclosure corresponding to those of the embodiments of the disclosure which will be described later are accompanied by parenthesized names and/or symbols which are used in the embodiments. However, the constituent elements of the disclosure are not limited to those in the embodiments defined by the names and/or the symbols. Other objects, other features, and attendant advantages of the present disclosure will be readily appreciated from the following description of the embodiments of the disclosure which is made with reference to the accompanying drawings.

DETAILED DESCRIPTION

A collision avoidance assist apparatus (hereinafter, sometimes referred to as a "present apparatus") of a vehicle according to an embodiment of the present disclosure will be described with reference to the drawings.

Figure 1:
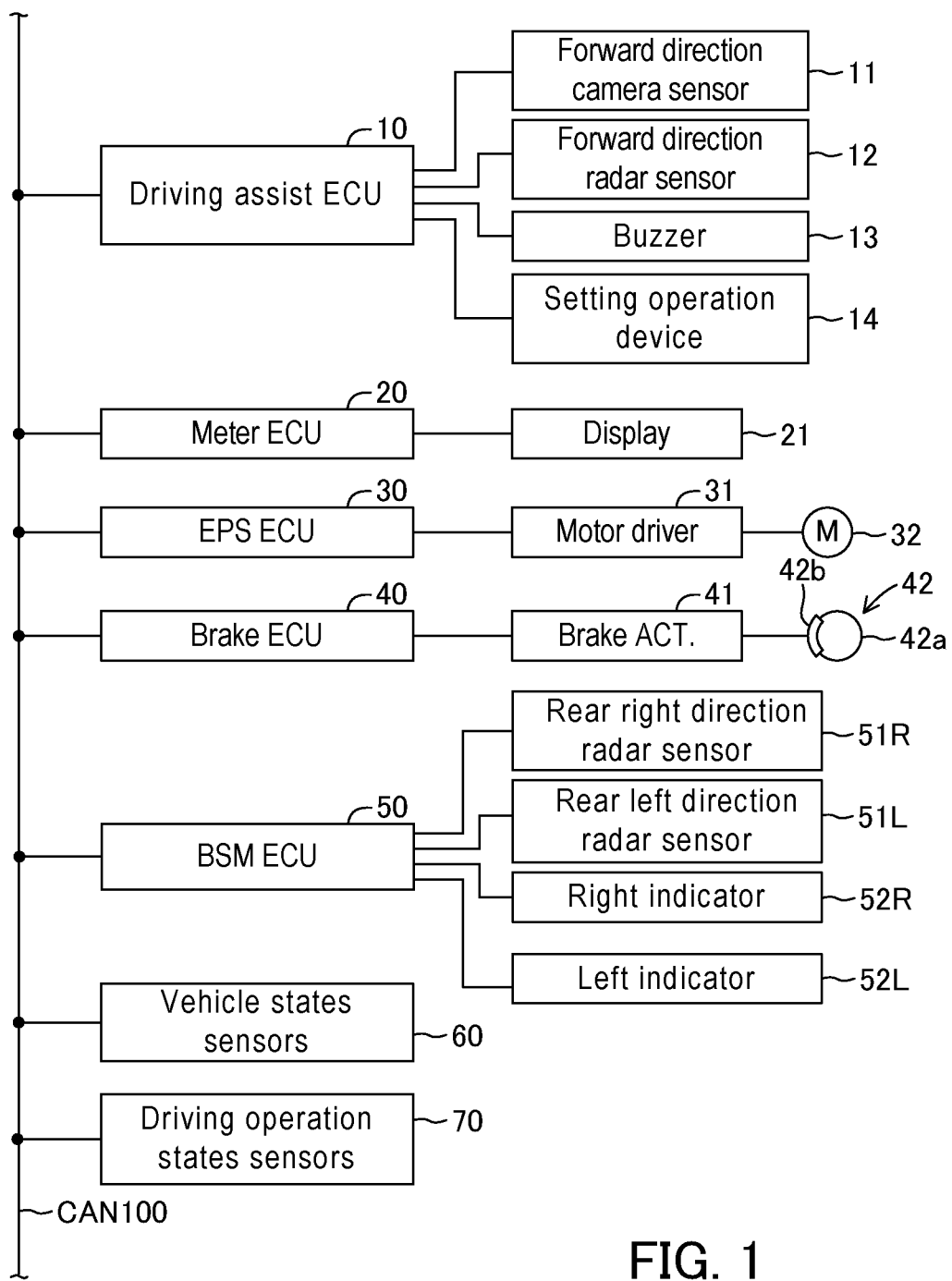
FIG. 1 is a schematic diagram of a collision avoidance assist apparatus according to an embodiment of the present disclosure.

The present apparatus is applied to a vehicle that may sometimes referred to as a "host vehicle" in order to be distinguished from other vehicles. As shown in FIG. 1, the present apparatus comprises a driving assist ECU 10, a meter ECU 20, an electric power steering ECU 30, a brake ECU 40, and a blind spot monitor ECU 50. Hereinafter, the electric power steering ECU 30 is referred to as an "EPS ECU 30", and the blind spot monitor ECU 50 is referred to as a "BSM ECU 50".

An "ECU" is an abbreviation of an Electronic Control Unit. The ECUs described above are connected with each other through a CAN (Controller Area Network) 100 so that one of the ECUs can transmit information to and receive information from the other any one of the ECUs. Each of the ECUs comprises, as a main component, a microcomputer including a CPU, a ROM, a RAM, a nonvolatile memory, and an interface I/F. The CPU achieves various functions described later through executing instructions (i.e., programs/routines) stored in the memory (ROM). Some or all of those ECUs may be integrated into a single ECU.

A plurality of vehicle states sensors 60 configured to detect vehicle states (running states) of the host vehicle are connected to the CAN 100, and a plurality of driving operation states sensors 70 configured to detect driving operation states of the host vehicle are also connected to the CAN 100. The vehicle states sensors 60 include a vehicle speed sensor configured to detect/measure a vehicle speed (speed of the host vehicle), a longitudinal acceleration sensor configured to detect an acceleration of the host vehicle in a longitudinal (front-rear) direction, a lateral acceleration sensor configured to detect an acceleration of the host vehicle in a lateral (left-right) direction, and a yaw rate sensor configured to detect a yaw rate of the host vehicle.

The driving operation states sensors 70 include an acceleration operation amount sensor configured to detect an operation amount of an acceleration pedal, a brake operation amount sensor configured to detect an operation amount of a brake pedal, a brake switch configured to detect presence or absence of an operation to the brake pedal, a steering angle sensor configured to detect a steering angle, a steering torque sensor configured to detect a steering torque, and a shift position sensor configured to detect a shift lever position for an transmission.

Information (hereinafter, referred to as "sensor information") detected by the vehicle states sensors 60 and the driving operation states sensors 70 is transmitted to the CAN 100. Each of the ECUs can utilize the sensor information transmitted to the CAN 100, as appropriate. It should be noted that the sensor information may be information detected by a sensor that is connected to a certain one of the ECUs. In this case, the certain one of the ECUs transmits the sensor information obtained from the connected sensor to the CAN 100. For instance, the steering angle sensor may be connected with the EPS ECU 30, which then transmits, as the sensor information, information indicative of the steering angle detected by the steering angle sensor to the CAN 100. This can be applicable to the other sensors. It should be also noted that the sensor information may be mutually exchanged between the specific ECUs through a direct communication between them, without using the CAN 100.

The driving assist ECU 10 is a main control device to perform a driving assist control (or a driver assist control to assist the driver to drive the host vehicle). The driving assist ECU 10 is configured to perform/execute, as the driving assist control, a collision avoidance assist control.

The collision avoidance assist control is a control to:
alert the driver when an obstacle ahead of the host vehicle is detected, the obstacle being an object having a high collision possibility of a collision between the host vehicle and the object; and
perform an autonomous braking (control) and/or an autonomous steering (control) when the collision possibility becomes higher, so as to avoid the collision.

The collision avoidance assist control is generally called a "PCS control (pre-crash safety control)", and thus, is sometimes referred to as the "PCS control".

The driving assist ECU 10 may be configured to perform driving assist controls other than the PCS control, in addition to the PCS control. For instance, the driving assist ECU 10 may be configured to carry out a lane keeping assist control to let the host vehicle travel/run along a center position of a host vehicle lane that is a lane in which the host vehicle is traveling/running.

The driving assist ECU 10 is connected with a front direction (forward area) camera sensor 11, a front direction (forward area) radar sensor 12, a buzzer 13, and a setting operation device 14.

Figure 2:
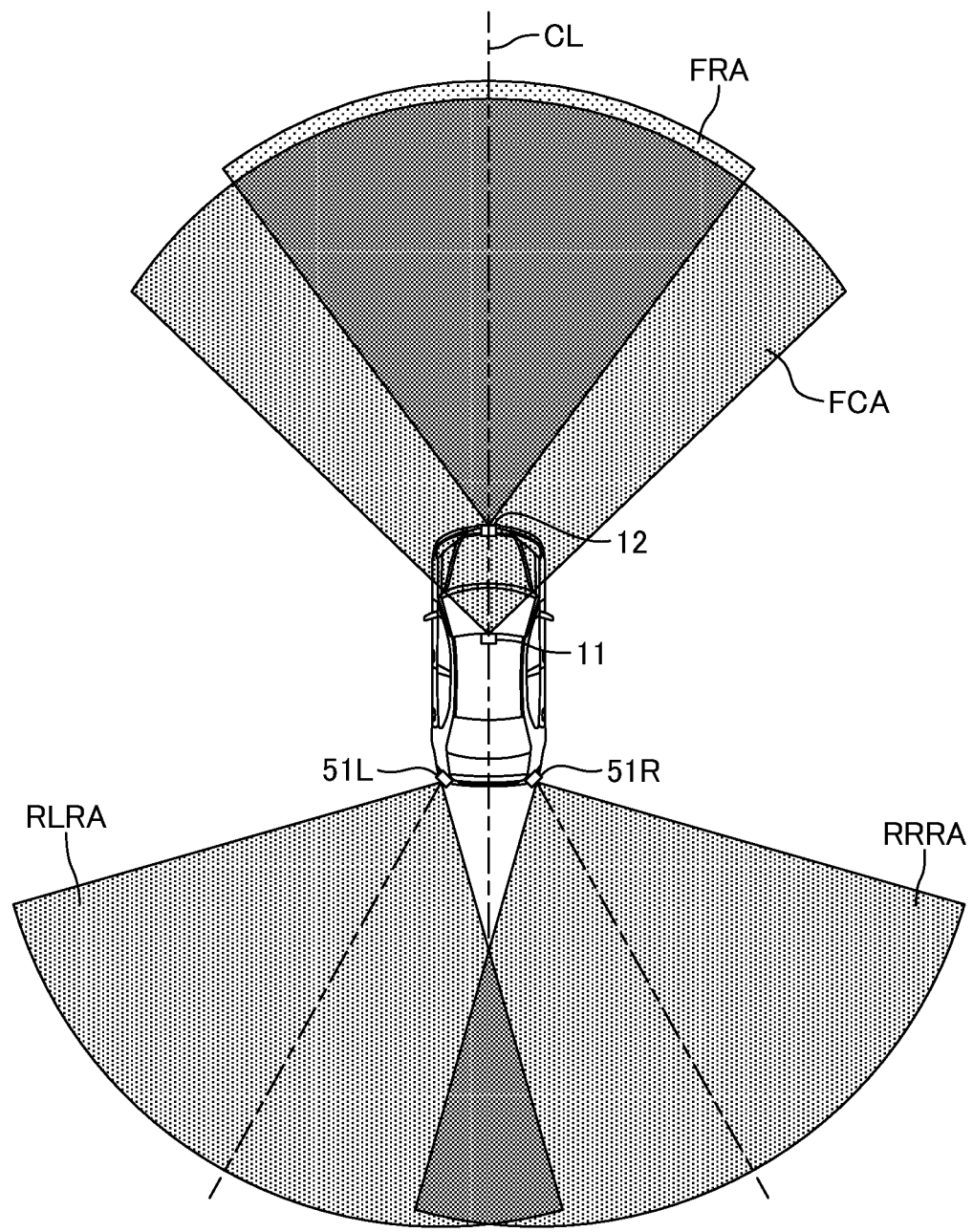
FIG. 2 is a plan view of a host vehicle, showing detection angle ranges of a front direction sensor and a rear side direction radar sensor.

As shown in FIG. 2, the front direction camera sensor 11 is arranged at an upper part of a front windshield and inside the interior cabin of the host vehicle. The front direction camera sensor 11 comprises an unillustrated camera section and an unillustrated image processing section configured to analyze image data captured/acquired by the camera section. The camera section of the front direction camera sensor 11 is a monocular camera and takes a picture of a scene (area) in front of (or ahead of) the host vehicle. As shown in FIG. 2, the front direction camera sensor 11 is placed/arranged on a longitudinal axis CL of a vehicle body of the host vehicle in such a manner that an optical axis of the camera section is parallel to the longitudinal axis CL of the vehicle body (or is orthogonal to the right-left (or width/lateral) direction of the vehicle body). The front direction camera sensor 11 takes a picture of (i.e., captures an image of) a front direction camera detection area FCA that is an area between a (first) diagonally forward left direction of the vehicle body and a (first) diagonally forward right direction of the vehicle body in a plan view, every time a predetermined time elapses.

The image processing section of the front direction camera sensor 11 is configured to recognize a road marking line such as a white line or a yellow line that is painted on the road (to define a lane) as well as an object (3D (three dimensional) object) that is present in front of (ahead of) the host vehicle based on the captured image, and to provide/transmit information on them (i.e., while line information, and 3D object information) to the driving assist ECU 10, every time the predetermined time elapses. The while line information includes information indicative of a shape (e.g., a curvature) of the white line, and information indicative of a relative positional relationship in a road width direction between the white line and the host vehicle. The 3D object information includes information indicative of a type and a size of the detected 3D object that is present ahead of the vehicle, and information indicative of a relative positional relationship (in both the longitudinal direction and the lateral direction) between the 3D object and the host vehicle. The type of the 3D object may be specified based on a machine learning.

The front direction radar sensor 12 is arranged at a center of a front end of the vehicle body and is configured to detect a 3D object that is present ahead of the host vehicle. More specifically, as shown in FIG. 2, the front direction radar sensor 12 is placed/arranged on the longitudinal axis CL of the vehicle body of the host vehicle in such a manner that a center axis of radar wave emitted from the sensor 12 is parallel to the longitudinal axis CL of the vehicle body (or is orthogonal to the width direction of the vehicle body). The front direction radar sensor 12 is configured to detect the 3D object that is present in a front direction radar detection area FRA that is an area between a (second) diagonally forward left direction of the vehicle body and a (second) diagonally forward right direction of the vehicle body in a plan view.

The front direction radar sensor 12 comprises an unillustrated radar wave emitting-receiving section and an unillustrated signal processing section. The radar wave emitting-receiving section is configured to emit a radar wave (i.e., electrical wave, and referred to as a "millimeter wave") in a millimeter wave band. The 3D object (e.g., an other vehicle, a pedestrian, a bicycle, a building, or the like) that is present within the front direction radar detection area FRA reflects the emitted millimeter wave. The radar wave emitting-receiving section is configured to receive the reflected millimeter wave. The signal processing section of the front direction radar sensor 12 is configured to, based on a phase difference between the emitted millimeter wave and the received millimeter wave, a time difference from a time point at which the millimeter wave is emitted to a time point at which the reflected millimeter wave is received, or the like, obtain radar information indicative of a distance between the 3D object and the host vehicle, a relative speed of the 3D object with respect to the host vehicle, a relative direction (orientation) of the 3D object with respect to the host vehicle, or the like. The front direction radar sensor 12 is configured to transmit the radar information (3D object information) to the driving assist ECU 10 every time a predetermined time elapses.

The driving assist ECU 10 synthesizes the 3D object information from the front direction camera sensor 11 and the 3D object information from the front direction radar sensor 12 so as to obtain more accurate 3D object information. The driving assist ECU 10 recognizes (specifies), based on the white line information from the front direction camera sensor 11, the host vehicle lane in which the host vehicle is traveling/running, and the adjacent lane which is adjacent (next) to the host vehicle lane.

Hereinafter, the front direction camera sensor 11 and the front direction radar sensor 12 may sometimes be collectively referred to as a "front direction sensor". The 3D object information from the front direction camera sensor 11 and the 3D object information from the front direction radar sensor 12 are information on the area ahead of the host vehicle, and may sometimes be referred to as "front direction information".

The buzzer 13 shown in FIG. 1 is configured to receive a buzzer activation signal sent from the driving assist ECU 10 so as to generate an alarm sound. The driving assist ECU 10 is configured to transmit the buzzer activation signal to the buzzer 13 to let the buzzer 13 generate the alarm sound, when the driving assist ECU 10 needs to alert the driver.

The setting operation device 14 is an operation device that allows the driver to set various parameters, and is arranged at, for instance, the steering wheel. The driving assist ECU 10 is configured to receive a signal (setting signal) for setting the parameters from the setting operation device 14, and to perform various setting processes. For instance, the setting operation device 14 is used to set an operation state of the driving assist control (e.g., the PCS control) to either an operable state in which the driving assist control is permitted to be carried out and an inoperable state in which the driving assist control is not permitted to be carried out.

The meter ECU 20 is connected with a display (indicator, or display device) 21, that is, for instance, a multi information display disposed in front of a driver's seat. The display 21 is configured to display various information in addition to measured values including the vehicle speed. For example, when the meter ECU 20 receives, from the driving assist ECU 10, a display instruction corresponding to a driving assist state, the meter ECU 20 lets the display 21 display a screen identified by the display instruction. It should be noted that an unillustrated head-up display may be employed as the display 21, instead of or in addition to the multi information display. It is preferable that an ECU exclusive for the head-up display be provided when the head-up display is employed.

The EPS ECU 30 is a controller for an electric power steering device, and is connected to a motor driver 31. The motor driver 31 is connected to a steering motor 32 that is an actuator for steering. The steering motor 32 is incorporated in an unillustrated steering mechanism of the host vehicle. The EPS ECU 30 is configured to detect the steering torque that is input by the driver to an unillustrated steering wheel using the steering torque sensor attached to an unillustrated steering shaft, and to control the motor driver 31 so as to drive the steering motor 32. When the steering motor 32 is driven as described above, a steering torque is applied to the steering mechanism so as to assist the driver's steering operation.

In addition, when the EPS ECU 30 receives a steering instruction from the driving assist ECU 10 through the CAN 100, the EPS ECU 30 drives the steering motor 32 based on a control amount that is specified by the steering instruction so as to generate the steering torque. This steering torque, which is different from the above described steering torque to assist the driver's steering operation, is a torque applied to the steering mechanism according to the steering instruction from the driving assist ECU 10.

The brake ECU 40 is connected to a brake actuator 41 that is provided in an unillustrated hydraulic circuit between an unillustrated master cylinder and a friction brake mechanism 42 of each of wheels. The master cylinder pressurizes brake (working) fluid according to a brake pedal pressing force. The friction brake mechanism 42 comprises a brake disc 42*a* fixed to each of the wheels, and a brake caliper 42b fixed to the vehicle body. The brake actuator 41 is configured to vary/adjust oil pressure applied to an unillustrated wheel cylinder in the brake caliper 42b in response to an instruction sent from the brake ECU 40. The wheel cylinder is operated by the oil pressure to press an unillustrated brake pad against the brake disc 42a so as to generate a frictional brake force. In this manner, the brake ECU 40 controls the brake actuator 41 to control the braking force of the host vehicle.

The BSM ECU 50 is a main controller of a bling spot monitor system. The BSM ECU 50 is connected with a rear right direction radar sensor 51R, a rear left radar sensor 51L, a right indicator 52R, and a left indicator 52L (refer to FIG. 2).

As shown in FIG. 2, the rear right direction radar sensor 51R is a radar sensor arranged/placed at a rear right corner of the vehicle body, and the rear left radar sensor 51L is a radar sensor arranged/placed at a rear left corner of the vehicle body. The rear right direction radar sensor 51R and the rear left radar sensor 51L have the same configurations as each other, except their detection areas. Hereinafter, when the rear right direction radar sensor 51R and the rear left radar sensor 51L need not to be distinguished from each other, each of them may be referred to as a "rear direction radar sensor 51".

The rear direction radar sensor 51 comprises an unillustrated radar wave emitting-receiving section and an unillustrated signal processing section, similarly to the front direction radar sensor 12.

The rear right direction radar sensor 51R is configured to emit a radar wave. A center axis of the radar wave emitted from the rear right direction radar sensor 51R is parallel to a diagonally backward right direction. The rear right direction radar sensor 51R is configured to detect a 3D object that is present in a rear right side direction radar detection area RRRA that is an area having the center axis of the radar wave emitted from the rear right direction radar sensor 51R and a predetermine angle range in a plan view.

The rear left radar sensor 51L is configured to emit a radar wave. A center axis of the radar wave emitted from the rear left radar sensor 51L is parallel to a diagonally backward left direction. The rear left radar sensor 51L is configured to detect a 3D object that is present in a rear left radar detection area RLRA that is an area having the center axis of the radar wave emitted from the rear left radar sensor 51L and a predetermine angle range in a plan view.

The rear direction radar sensor 51 obtains and transmits information regarding a detected 3D object to the BSM ECU 50. The information regarding a detected 3D object that the rear direction radar sensor 51 obtains is hereinafter referred to as "rear direction information" and includes information indicative of a distance between the 3D object and the host vehicle, a relative speed of the 3D object with respect to the host vehicle, a relative direction (orientation) of the 3D object with respect to the host vehicle, or the like.

Hereinafter, the 3D object detected by one of the front direction sensor and the rear direction radar sensor 51 may sometimes be referred to as a "target object".

It should be noted that the FIG. 2 depicts a detection angle range of each of the front direction camera detection area FCA, the front direction radar detection area FRA, the rear right side direction radar detection area RRRA, and the rear left radar detection area RLRA, but does not depict a detection distance of each of the areas. The detection distance of each of the areas is longer than the distance shown in FIG. 2.

Each of the right indicator 52R and the left indicator 52L is a device to alert (issue a warning to) the driver. For example, the right indicator 52R is arranged at (or incorporated in) a right side-view mirror, and the left indicator 52L is arranged at (or incorporated in) a left side-view mirror. The right indicator 52R and the left indicator 52L have the same configuration as each other. Hereinafter, when the right indicator 52R and the left indicator 52L need not to be distinguished from each other, each of them may be referred to as an "indicator 52".

The BSM ECU 50 is configured to:

determine whether or not "an other vehicle, at least a part of which is within a blind spot of the driver" is present, based on the rear direction information (i.e., backward/rear surrounding information) transmitted from the rear direction radar sensor 51; and recognize/regard "the other vehicle, at least a part of which is determined to be within the blind spot of the driver" as an object to watch out for (or an object that the drive should notice).

In addition, the BSM ECU 50 is configured to:

determine whether or not "an other vehicle that is predicted/expected to enter the blind spot of the driver within a predetermined set time period" is present, based on the rear direction information transmitted from the rear direction radar sensor 51; and recognize/regard "an other vehicle which is predicted/expected to enter the blind spot of the driver within the predetermined set time period" as the object to watch out for.

When it is determined that the object (the other vehicle) to watch out for is present, the BSM ECU 50 turns on (or activates) the indicator 52 that corresponds to a location of the blind spot (i.e., the right side blind spot that is the blind spot on the right side of the host vehicle or the left side blind spot that is the blind spot on the left side of the host vehicle) where the object to watch out for is present. Namely, the BSM ECU 50 turns on the right indicator 52R when the object to watch out for is present in the right side blind spot, and the BSM ECU 50 turns on the left indicator 52L when the object to watch out for is present in the left side blind spot. Therefore, the BSM ECU 50 can notice the driver of the presence of the other vehicle that is not reflected in any of the mirrors including the side-view mirrors and a rear-view mirror.

<PCS Control>

The PCS control will next be described. The driving assist ECU 10 is configured to determine, based on the front direction information sent from the front direction sensor and the vehicle states detected by the vehicle states sensors 60, whether or not the host vehicle is highly likely to collide with a 3D object (target object) that is present in front of the host vehicle. For instance, the driving assist ECU 10 determines whether or not the host vehicle is highly likely to collide with the 3D object under the assumption that the 3D object keeps the current moving state (e.g., a stopped state if the 3D object is a stationary object) and the host vehicle keeps the current moving (traveling) state. When the driving assist ECU 10 determines that the host vehicle is highly likely to collide with the 3D object based on the above determination result, the driving assist ECU 10 recognize/regards that 3D object as an obstacle.

When the driving assist ECU 10 has recognized the obstacle, the driving assist ECU 10 calculates (obtains through calculation) a time to collision TTC that is a predicted time length from a present time point to a collision time point between the host vehicle and the obstacle. The time to collision TTC is calculated based on the following equation (1) using a distance d between the host vehicle and the obstacle, and a relative speed Vr of the obstacle with respect to the host vehicle.

$$TTC=d/Vr \tag{1}$$

The time to collision TTC is used as an index value that is indicative of a possibility (degree) that the host vehicle collides with the obstacle (or indicative of imminency of the collision). The possibility that the host vehicle collides with the obstacle (i.e. the possibility of the collision) is higher as the time to collision TTC is smaller.

In the PCS control according to the present embodiment, the possibility of the collision is classified into two stages/levels (i.e., a first stage and a second stage) based on the time to collision TTC. In the first (initial) stage, the driver is alerted with the buzzer 13 and the display 21. In the second stage where the possibility of the collision is higher as compared to the first stage, the brake control (autonomous brake) and/or the steering control (autonomous steering) are preformed as the collision avoidance assist control.

The driving assist ECU 10 determines that the possibility of the collision between the host vehicle and the obstacle has reached the first stage when the time to collision TTC has decreased to a threshold for alerting TTCw. The driving assist ECU 10 determines that the possibility of the collision between the host vehicle and the obstacle has reached the second stage when the time to collision TTC has further decreased to a threshold for executing TTCa that is shorter/smaller than the threshold for alerting TTCw (i.e., TTCa<TTCw).

The driving assist ECU 10 performs the collision avoidance assist control by executing either the autonomous brake or the autonomous steering selectively, according to an overlap ratio indicative of a relative positional relationship in the width direction between the host vehicle and the obstacle, when the possibility of the collision between the host vehicle and the obstacle has reached the second stage.

Figure 3:
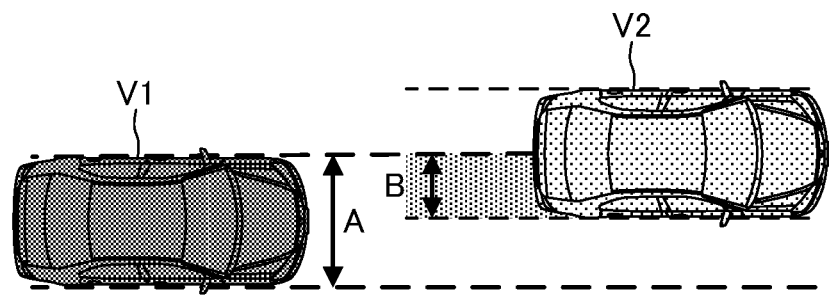
FIG. 3 is a plan view of the host vehicle and an object for describing an overlap ratio.

The overlap ratio will be described, hereinafter. As shown in FIG. 3, the overlap ratio L (%) is an index value indicative of a degree of overlapping between the host vehicle V1 and the other vehicle V2 under the assumption that the host vehicle V1 collides with the other vehicle V2. In other words, the overlap ratio L (%) is calculated by dividing a length B by a width A of the host vehicle V1, as indicated by the following equation (2), wherein the length B is a length of a part overlapping between the host vehicle V1 and the other vehicle V2 in the width direction.

$$L=(B/A)\cdot 100(\%) \tag{2}$$

Figure 4:
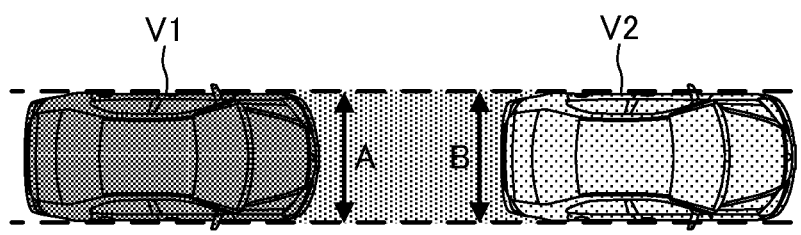
FIG. 4 is a plan view of the host vehicle and the object for describing the overlap ratio.

Thus, in an example shown in FIG. 4, the overlap ratio L is 100%.

Figure 5:
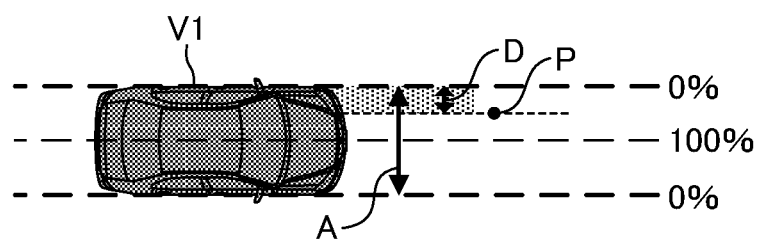
FIG. 5 is a plan view of the host vehicle and the object for describing the overlap ratio.

As shown in FIG. 5, if the obstacle is a pedestrian whose position is represented by a point P, the overlap ratio L is defined in such a manner that the overlap ratio L is 100% when the position P is on a center line in the width direction of the host vehicle V1, and that the overlap ratio L is 0% when the position P is on an extended line of one of sides of the host vehicle V1. Namely, the overlap ratio L (%) is calculated through dividing a distance D between one of the sides of the host vehicle V1 and the position P in the width direction by a half of the width A of the host vehicle V1, as indicated by the following equation (3).

$$L=[(D/(A/2)])\cdot 100(\%)=(2D/A)\cdot 100(\%) \tag{3}$$

The autonomous brake is carried out as the collision avoidance assist if the overlap ratio L is relatively high when the possibility of the collision between the host vehicle and the obstacle has reached the second stage, whereas, the autonomous steering (toward a direction to lower the overlap ratio L) is carried out as the collision avoidance assist if the overlap ratio L is relatively low when the possibility of the collision between the host vehicle and the obstacle has reached the second stage.

For instance, the driving assist ECU 10 performs the autonomous brake as the collision avoidance assist if the overlap ratio L is higher than a threshold (overlap threshold) Lref. More specifically, the driving assist ECU 10 calculates (obtains through calculation) a target deceleration to avoid the collision between the host vehicle and the obstacle, and transmits the brake instruction including the obtained target deceleration to the brake ECU 40. The brake ECU 40 controls the brake actuator 41 to generate the friction brake force to the wheels in such a manner that the host vehicle decelerates at the target deceleration.

It should be noted that the driving assist ECU 10 may cancel the autonomous brake when a brake pedal operation by the driver is detected, so as to give priority to the brake pedal operation. In this case, it is preferable that the friction brake force generated according to the operation amount (or pressing force) of the brake pedal be made larger than the brake force of when there is no obstacle.

In contrast, if the overlap ratio L is equal to or lower than the threshold Lref, the driving assist ECU 10 determines whether or not there is a collision avoidance space (or a collision avoidance path) for avoiding the collision between the host vehicle and the obstacle in the direction that lowers the overlap ratio L, and performs the autonomous steering as the collision avoidance assist if collision avoidance space is determined to be present. In this case, the driving assist ECU 10 calculates (obtains through calculation) a target steering angle to let the host vehicle move toward the collision avoidance space (or to let the host vehicle travel along the collision avoidance path), and transmits the steering instruction including the obtained target steering angle to the EPS ECU 30. The EPS ECU 30 controls the steering motor driver 32 in such a manner that an actual steering angle coincides with the target steering angle. This allows the host vehicle to move toward the collision avoidance space. It should be noted that the driving assist ECU 10 may cancel the autonomous steering when a steering operation by the driver is detected, so as to give priority to the steering operation by the driver.

In the present embodiment, the front direction camera sensor 11 and the front radar sensor 12 constitute the front direction sensor. Thus, the present apparatus cannot detect an object that is present in the vicinity of a position in a wider area having a wide angle. In other words, the present apparatus has no problem in executing the autonomous steering as the collision avoidance assist when and if the present apparatus performs the autonomous steering within the host vehicle lane (i.e., when the collision avoidance space is present within the host vehicle lane). However, the front direction sensor is not sufficient to detect an object that is present in the adjacent lane. Therefore, the front direction sensor is not sufficient to let the vehicle deviate from the host vehicle lane if the collision avoidance space is present in the adjacent lane. In other words, the front direction sensor cannot monitor a movable object such as the other vehicle and the pedestrian) ahead of the host vehicle over a wide range. This makes it difficult to execute the autonomous steering that may cause the host vehicle enter the adjacent lane as the collision avoidance assist. On the other hand, adding front side direction sensors makes the apparatus more complicated, and makes the apparatus be too expensive to be installed on low priced vehicles.

In view of the above, the present apparatus is configured to, when the collision avoidance space has been detected that causes the host vehicle to enter the adjacent lane using the forward direction sensor, determine whether a current situation is a specific situation described below based on the forward direction sensor information that includes information regarding an edge (or end) of the adjacent lane of a road. The specific situation is a situation in which it can be predicted that a movable object will not enter the adjacent lane that includes the collision avoidance space. By determining whether or not the current situation is the specific situation, the present apparatus does not need to monitor (a movement of) an object that is present at a position on the side of the forward direction area of the host vehicle.

<Steering PCS Control Routine>

Figure 6:
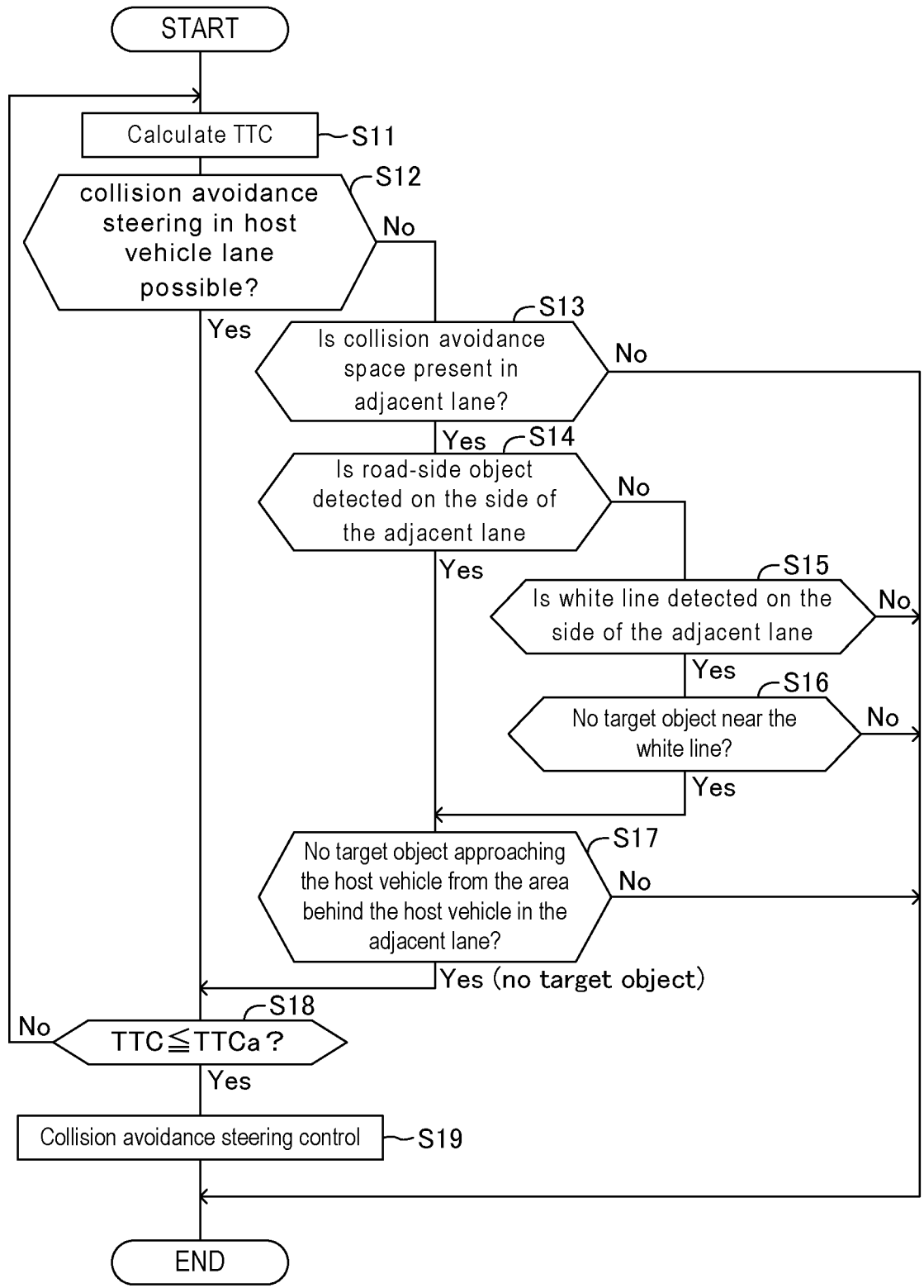
FIG. 6 is a flowchart representing a steering PCS control routine.

The PCS control of the present apparatus includes the autonomous steering to avoid the collision. Hereinafter, processing of the PCS control using the autonomous steering will be described. When the obstacle is detected in front of the vehicle, the driving assist ECU 10 calculates the overlap ratio L regarding the detected obstacle, and executes a PCS control routine shown in FIG. 6 when the overlap ratio L is smaller than the overlap ratio threshold Lref.

It should be noted that, as described above, the driving assist ECU 10 performs the PCS control using the autonomous brake when the overlap ratio L is larger than the overlap ratio threshold Lref. Moreover, as described above, the driving assist ECU 10 executes the alert processing to alert the driver (while the time to collision TTC is equal to or shorter than the threshold for alerting TTCw) in addition to the PCS control using the autonomous brake or the PCS control using the autonomous steering.

When and after the driving assist ECU 10 starts the steering PCS routine, the driving assist ECU 10 calculates the time to collision TTC at step S11. Subsequently, the driving assist ECU 10 determines whether or not it is possible to avoid the collision by the autonomous steering within the host vehicle lane, based on the front direction information transmitted from the front direction sensor, at step S12. In other words, the driving assist ECU 10 determines whether or not there is the collision avoidance space to avoid the collision between the host vehicle and the obstacle for the autonomous steering that is within the host vehicle lane and that does not cause the host vehicle to deviate from the host vehicle lane. Hereinafter, a collision avoidance (control) using an autonomous steering may sometimes referred to as a "collision avoidance steering (control)".

Figure 7:
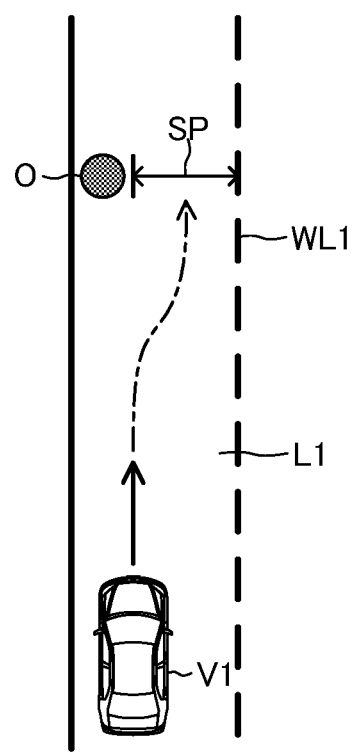
FIG. 7 is a plan view of the host vehicle and the object for describing a collision avoidance using autonomous steering within a host vehicle lane.

For instance, as shown in FIG. 7, the collision avoidance path (that does not cause the host vehicle to deviate from the host vehicle lane) can be found/drawn within the host vehicle lane L1, when a space (i.e., collision avoidance space) through which the host vehicle V1 can move/pass is detected/found between the obstacle and the right white line WL1. In this case, it can be determined that the collision avoidance steering is possible within the host vehicle lane L1.

It should be noted that, when both of the right and left white lines are detected, the driving assist ECU 10 recognizes/determines a range between the right and left white lines as the host vehicle lane. When only one of the right and left white lines is detected, but a stationary road-side object that is present in the opposite direction with respect to the detected one of the right and left white lines in the width direction is detected, the driving assist ECU 10 recognizes/determines, as the host vehicle lane, a range between the detected one of the right and left white lines and the detected stationary road-side object.

When the driving assist ECU 10 determines that the collision avoidance steering is possible within the host vehicle lane (S12: Yes), the driving assist ECU 10 proceeds to step S18 and determines whether or not the time to collision TTC is equal to or smaller/shorter than the threshold for executing TTCa.

When the time to collision TTC is larger/longer than the threshold for executing TTCa (S18, No), the driving assist ECU 10 goes back to step S11. Thus, the above processes are repeated as long as the time to collision TTC is larger/longer than the threshold for executing TTCa. It should be noted that the driving assist ECU 10 switches from the collision avoidance assist using the autonomous steering to the collision avoidance assist using the autonomous brake, if the overlap ratio L becomes equal to or smaller than the overlap ratio threshold Lref while the above processes are being repeated. This may happen when the obstacle O moves while the above processes are being repeated.

When the driving assist ECU 10 determines that it is not possible to avoid the collision by the autonomous steering within the host vehicle lane (S12: No), the driving assist ECU 10 proceeds to step S13.

At step S13, the driving assist ECU 10 determines whether or not a space is present (collision avoidance space exists) in the adjacent lane that is adjacent to the host vehicle lane, based on the front direction sensor information. In other words, the driving assist ECU 10 determines whether or not an object having a possibility of causing another collision (second collision) with the host vehicle is present in a space which the host vehicle enters when the host vehicle deviates from the host vehicle lane by the collision avoidance steering. For instance, the driving assist ECU 10 determines that such a space (collision avoidance space) is not present (does not exist) in the following cases.

A case where an other vehicle having a possibility of causing the second collision is present in the adjacent lane.

A case where the road (host vehicle road) on which the host vehicle is running has double lanes (i.e., the host vehicle road has only one lane in a direction the host vehicle is moving (namely, one lane for traffic) so that there is no adjacent lane).

Hereinafter, the adjacent lane means a lane which the vehicle is enter by the collision avoidance steering (i.e., a lane to which the host vehicle is directed owing to the collision avoidance assist using the autonomous steering).

When the driving assist ECU 10 determines that the collision avoidance space is not present (does not exist) in the adjacent lane (S13: No), the driving assist ECU 10 ends the steering PCS control routine tentatively. Thus, in this case, the collision avoidance assist using the autonomous steering is not carried out. After a predetermine time period elapses, the driving assist ECU 10 restarts the steering PCS control routine.

In contrast, when the driving assist ECU 10 determines that the collision avoidance space is present (exists) in the adjacent lane (S13: Yes), the driving assist ECU 10 proceeds to step S14. At step 14, the driving assist ECU 10 determines, based on the front sensor information, whether or not the road-side object has been detected on the side of the adjacent lane with respect to the host vehicle (e.g., on the right side when the adjacent lane is on the right of the host vehicle, and on the left side when the adjacent lane is on the left of the host vehicle). The road-side object is an object that is positioned/placed at an edge/blink of the road to be able to prevent a movable object (e.g., a bicycle, a vehicle, a pedestrian, or the like) from entering the road (on which the host vehicle is traveling) from an area outside of the road, and includes shrubberies and guard rails. If the road-side object has been detected on the side of (or in the direction of) the adjacent lane with respect to the host vehicle, a position of the detected road-side object is determined/regarded as an edge/blink of the host road on the side of the adjacent lane.

At step S14 described above, the driving assist ECU 10 makes the determination based on the information transmitted from the front direction camera sensor 11 among the front direction sensor(s), but may make the determination based on the information transmitted from the front direction camera sensor 11 as well as the front direction radar sensor 12.

Figure 8B:
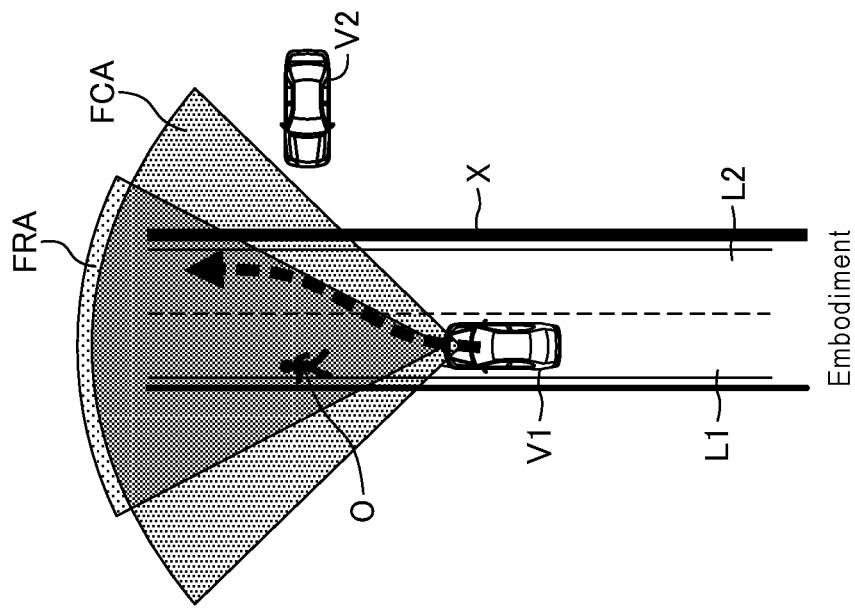
FIG. 8B is a plan view of the host vehicle and an other vehicle for describing detection angle ranges when an apparatus does not comprise the front side direction sensors.
Figure 8A:
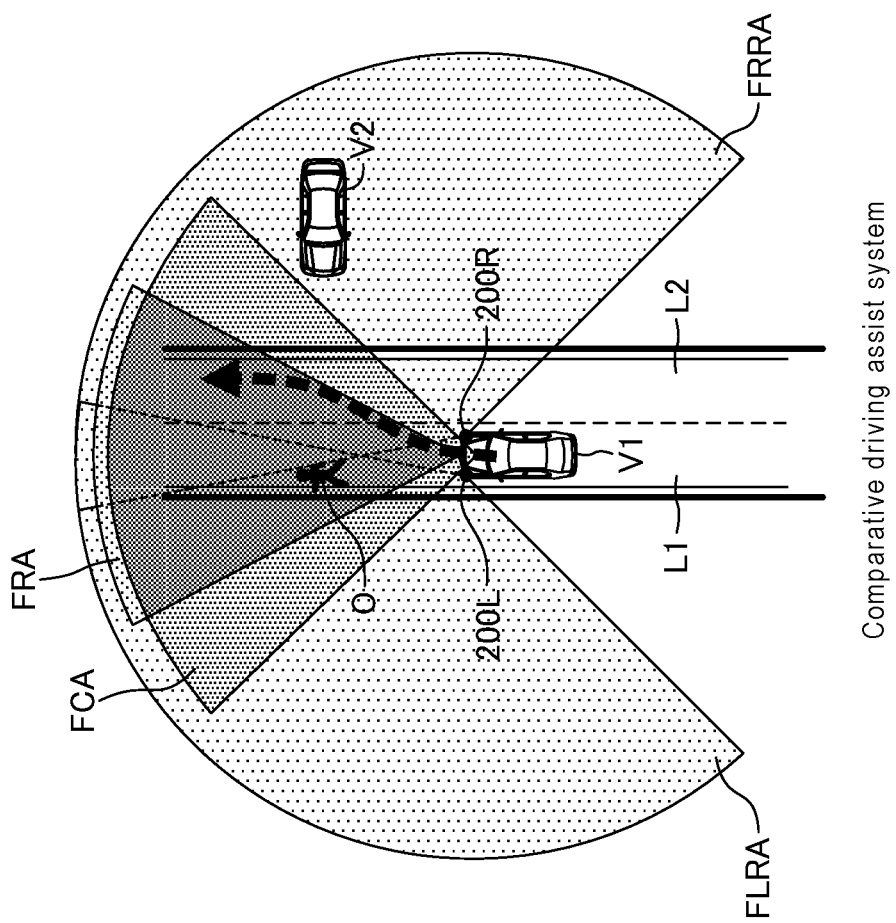
FIG. 8A is a plan view of the host vehicle and an other vehicle for describing detection angle ranges when an apparatus comprises front side direction sensors.

For instance, as understood from an example shown in FIG. 8A, if a comparative driving assist system has front side radar sensors 200R and 200L arranged at the front right corner and the front left corner, respectively in addition to the front direction sensor, the comparative driving assist system has a front direction detection area that is wider in the width direction than the front direction detection area of the driving assist system of the present embodiment. In the FIG. 8A, the reference symbol of "FLRA" indicates a detection angle range of the front right side direction sensor 200R, and reference symbol of "FRRA" indicates a detection angle range of the front left side direction sensor 200L. Accordingly, the comparative driving assist system having the front side radar sensors 200R and 200L can detect/recognize an object (e.g., the other vehicle V2) that is about to enter the adjacent lane L2 from a side area (in a lateral direction). Thus, the comparative driving assist performs the collision avoidance steering when that object is not detected so that the second collision would not occur. Moreover, even if the comparative driving assist system detects the object that is about to enter the adjacent lane L2 from the side area (in the lateral direction), the comparative driving assist system can determine, based on a relative position of the object with respect to the host vehicle V1 and a relative speed of the object with respect to the host vehicle V1, whether or not there is no possibility of the second collision when the collision avoidance steering for letting the host vehicle V1 deviate from the host vehicle lane to the adjacent lane is carried out. In this manner, the comparative driving assist system can perform the collision avoidance steering while avoiding the second collision.

However, a high cost and a long time are required to develop a system to detect/recognize an object using the front side radar sensors 200R and 200L. In addition, the comparative driving assist system having the front side radar sensors 200R and 200L requires a lot of memory capacity of the control unit and increases a calculation load for the control unit.

In view of the above, the present apparatus according to the embodiment of the present disclosure holds the same configuration (i.e., a configuration having the front camera sensor 11 and the front radar sensor 12 and not having front side radar sensors) as the typical collision avoidance assist apparatus, but is configured to determine whether or not the road-side object has been detected at the position on the side of the adjacent lane so as to be capable of recognizing a case where it is predicted that there is no object (e.g., the other vehicle) that is likely to enter the adjacent lane from the area outside of the host vehicle road.

For instance, as shown in FIG. 8B, the present apparatus has relatively narrow detection angle ranges (FRA, FCA), and therefore, cannot detect the other vehicle V2 that is away from the collision avoidance space in the lateral (width) direction, using the front direction sensor. However, the present apparatus can detect the road-side object X provided on the side of the adjacent lane L2 using the front direction sensor. The road-side object X is an object next to (on the side of) the collision avoidance space. When the road-side object X is detected, it can be predicted/estimated that a movable object (e.g., the other vehicle V2) will not enter the adjacent lane L2 from the outside of the road-side object X (over the road-side object X).

When the driving assist ECU 10 determines that the road-side object is present on the side of the adjacent lane (S14: Yes), the driving assist ECU 10 proceeds to step S17. Whereas, when the driving assist ECU 10 determines that the road-side object is not present on the side of the adjacent lane (S14: No), the driving assist ECU 10 proceeds to step S15.

Figure 10:
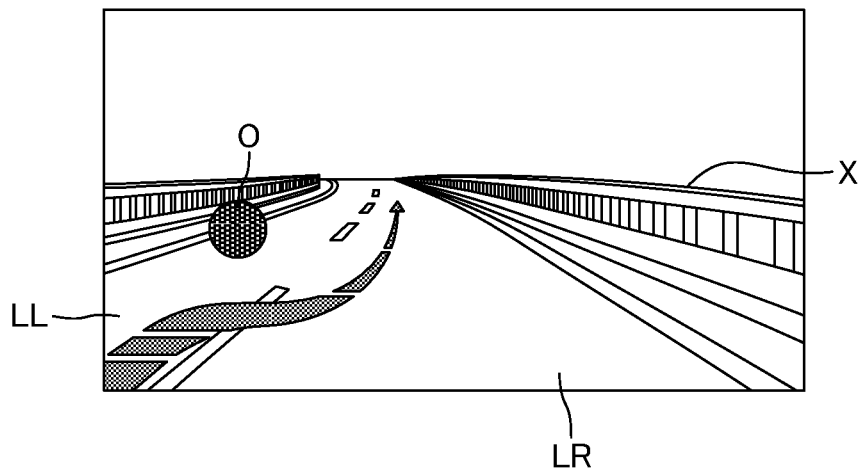
FIG. 10 is a view through a front windshield of the host vehicle.

FIG. 10 depicts a scene where an obstacle O is detected in front of the host vehicle while the host vehicle is running on the left lane LL. In this example, a collision avoidance space is detected in the right lane LR (in the same traffic as the left lane LL) and a road-side object X (e.g., a guard rail X) is detected at the edge of the road on the side of the right lane LR. Therefore, in this example, the driving assist ECU 10 makes a "Yes" determination at step S14.

Figure 11:
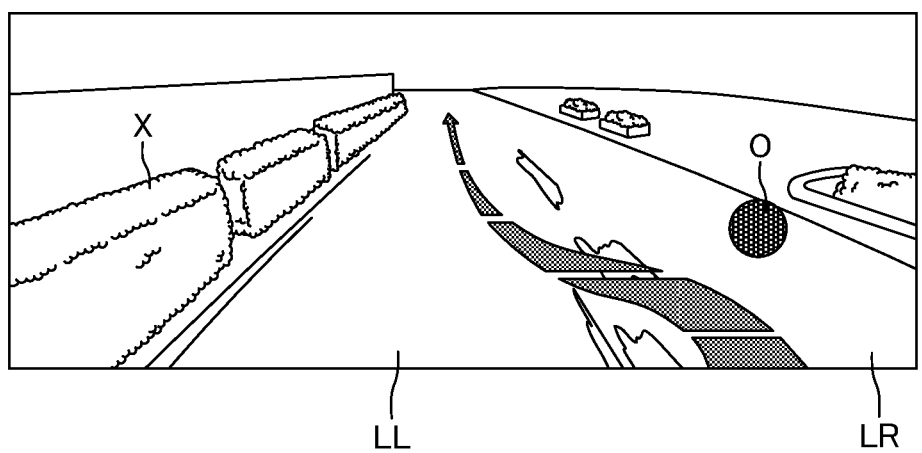
FIG. 11 is a view through the front windshield of the host vehicle.

FIG. 11 depicts a scene where an obstacle O is detected in front of the host vehicle while the host vehicle is running on the right lane LR. In this example, a collision avoidance space is detected in the left lane LL (in the same traffic as the right lane LR) and a road-side object X (e.g., shrubberies X) is detected at the edge of the road on the side of the left lane LL. Therefore, in this example as well, the driving assist ECU 10 makes a "Yes" determination at step S14.

When the driving assist ECU 10 determines that the road-side object is not present on the side of the adjacent lane (S14: No), the driving assist ECU 10 proceeds to step S15 and determines whether or not a white line is present on the side of the adjacent lane, based on the information transmitted from the front direction camera sensor 11. It should be noted that the white line that is present on the side of the adjacent lane does not mean a boundary line between the host vehicle lane and the adjacent lane, but means a white line that is away from the boundary line (i.e., a line that defines the adjacent lane together with the boundary line). The white line that is present on the side of the adjacent lane to be detected may be any kind of lines (e.g., a continuous solid line, or a broken line). When the white line that is present on the side of the adjacent lane is detected, the driving assist ECU 10 regards the white line as an edge of the host vehicle road on the side of the adjacent lane.

Figure 9:
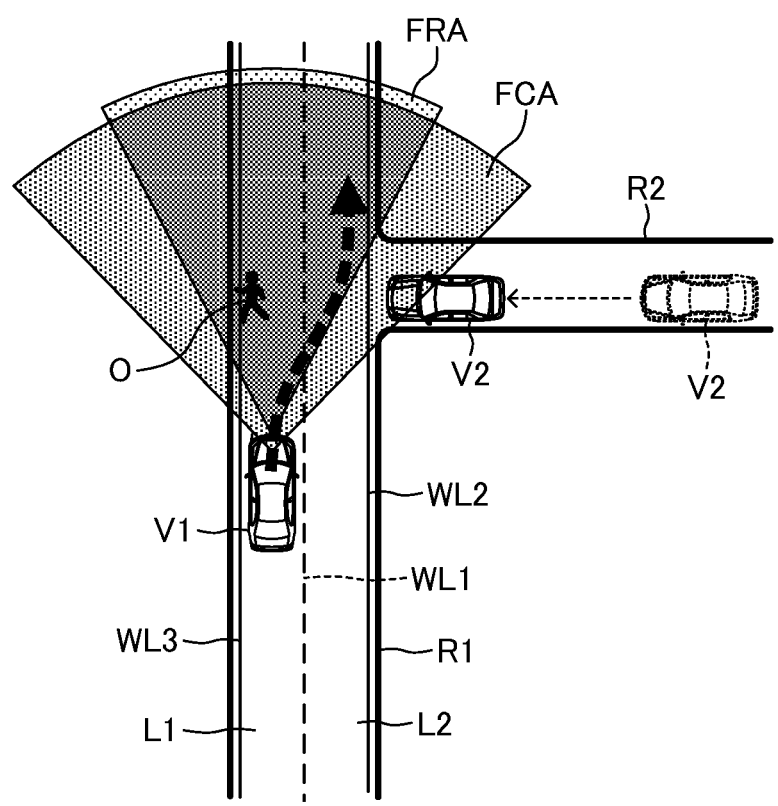
FIG. 9 is a plan view of the host vehicle and an other vehicle for describing a specific situation.

For instance, FIG. 9 depicts a case where an other road R2 (hereinafter, referred to as a joined road R2) joins a road R1 (hereinafter, referred to as a host vehicle road R1) on the side of the adjacent lane L2 (that is adjacent to the host vehicle lane L1). The joined road R2 may be a road that connects between the host vehicle road R1 and a facility. In this example, white lines WL1, WL2, and WL3 are painted on the host vehicle road R1. Since the host vehicle road R1 is a priority road with respect to the joined road R2, the white line WL2 is painted continuously at a part at which the host vehicle road R1 and the joined road R2 join each other.

When the other vehicle V2 is about to enter the host vehicle road R1 from the joined road R2, the other vehicle V2 stops behind the white line WL1 before entering the host vehicle road R1. Therefore, when the white line WL2 is detected on the side of the adjacent lane L2 with respect to the host vehicle V1 and any object is not detected in the vicinity of the white line WL2, it can be predicted that no movable object will enter the adjacent lane L2 from an area outside of the host vehicle road R1 while the host vehicle V1 is being caused to enter the adjacent lane L2 by the collision avoidance steering.

When the driving assist ECU 10 determines that the white line is detected on the side of the adjacent lane (S15: Yes), the driving assist ECU 10 proceeds to step S16 and determines whether or not there is no target object (e.g., an other vehicle, a bicycle, a pedestrian, or the like) in the vicinity of (near) the detected white line on the side of the adjacent lane, based on the front direction information transmitted from the frond direction sensor. The determination at step S16 is made using the front direction information transmitted from both of the front direction camera sensor 11 and the front direction radar sensor 12.

When the driving assist ECU 10 determines that there is no target object in the vicinity of the detected white line on the side of the adjacent lane (S16: Yes), the driving assist ECU 10 proceeds to step S17.

In contrast, the driving assist ECU 10 ends the steering PCS control routine tentatively, when:
- the driving assist ECU 10 determines that the white line is not detected on the side of the adjacent lane (S15: No); or
- the driving assist ECU 10 determines, even when the white line is detected, that there is a target object in the vicinity of the detected white line (S16: No).

In either of the above cases, the collision avoidance assist using the autonomous steering is not carried out. After the predetermine time period elapses, the driving assist ECU 10 restarts the steering PCS control routine.

Figure 12:
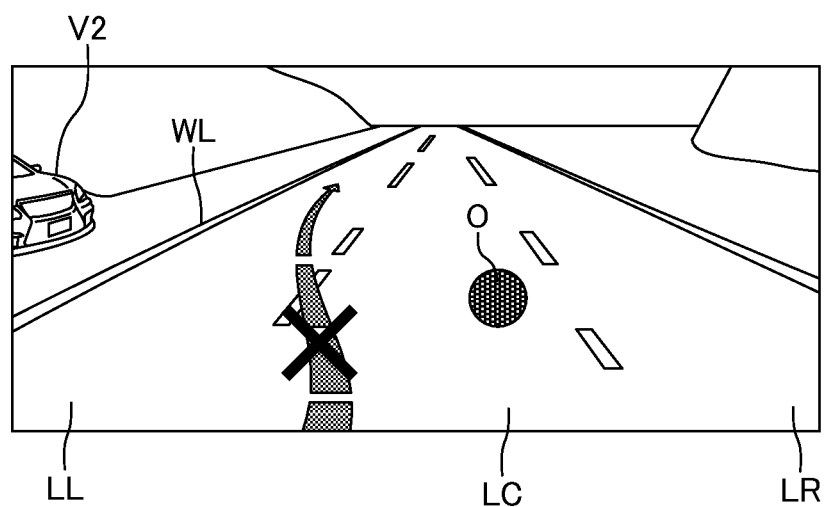
FIG. 12 is a view through the front windshield of the host vehicle.

FIG. 12 depicts a scene where an obstacle O is detected in front of the host vehicle while the host vehicle is running on the center lane LC between the right lane LR and the left lane LL. In this example, a collision avoidance space is detected in the left lane LL (on the side of the collision avoidance direction), and a white line WL on the left lane LL is continuously detected (a white line WL that continues to be detected). Furthermore, in this example, a target object (the other vehicle V2) is detected in the vicinity of the white line WL next to the collision avoidance space. Thus, in this example, the driving assist ECU 10 makes a "No" determination at step S16.

At step S17, the driving assist ECU 10 determines whether or not there is no target object (the other vehicle) that is approaching the host vehicle from an area behind the host vehicle. In this case, the driving assist ECU 10 obtains the information from the rear direction radar sensor 51 via the BSM ECU 50 to make the determination based on the obtained information.

For example, the driving assist ECU 10 determines that there is no target object that is approaching the host vehicle from the area behind the host vehicle, when:
- no target object is detected/recognized by the rear direction radar sensor 51; or
- the driving assist ECU 10 determines that there is no possibility of a second collision between the host vehicle and the target object that is approaching the host vehicle from the area behind the host vehicle, based on the relative position of the target object with respect to the host vehicle and the relative speed of the target object with respect to the host vehicle, even if the target object is detected/recognized by the rear direction radar sensor 51.

In addition to or in place of the above configuration, the driving assist ECU 10 may determine that there is a target object that is approaching the host vehicle from the area behind the host vehicle, when the BSM ECU 50 has been detecting the object (the other vehicle) to watch out for in the adjacent lane (in other words, when the BSM ECU 50 is activating the indicator 52).

The driving assist ECU 10 ends the steering PCS control routine tentatively, when the driving assist ECU 10 determines that there is a target object that is approaching the host vehicle from the area behind the host vehicle (S17: No). In this case, the collision avoidance assist using the autonomous steering is not carried out. After the predetermine time period elapses, the driving assist ECU 10 restarts the steering PCS control routine.

In contrast, the driving assist ECU 10 proceeds to step S18, when the driving assist ECU 10 determines that there is no target object that is approaching the host vehicle from the area behind the host vehicle (S17: Yes).

At step S18, the driving assist ECU 10 determines whether or not the time to collision TTC is equal to or smaller than the threshold for executing TTCa, and returns to step S11 when the time to collision TTC is larger than the threshold for executing TTCa so as to repeat the above processes.

When the time to collision TTC is equal to or smaller than the threshold for executing TTCa while the above described processes are being repeated (S18: Yes), the driving assist ECU 10 proceeds to step S19 and performs the collision avoidance steering control (i.e., executes control for the collision avoidance assist using the autonomous steering). In this case, the driving assist ECU 10 calculates the target steering angle to let the host vehicle move toward the collision avoidance space (or to let the host vehicle travel along the collision avoidance path), and transmits the steering instruction including the target steering angle to the EPS ECU 30. The EPS ECU 30 controls the steering motor driver 32 in such a manner that an actual steering angle coincides with the target steering angle. This allows the host vehicle to move toward the collision avoidance space.

The driving assist ECU 10 ends the steering PCS control routine after the collision avoidance steering control is completed. This can avoid the host vehicle from colliding with the obstacle (or can mitigate a damage/impact of the collision between the host vehicle and the obstacle).

The collision avoidance assist apparatus (the present apparatus) of the embodiment according to the present disclosure has been described. The present apparatus determines whether or not the collision avoidance space is present (exists) in the adjacent lane when the present apparatus cannot avoid the collision through the autonomous steering within the host vehicle lane. When the collision avoidance space is determined to be present in the adjacent lane, the present apparatus determines whether or not a current situation is a specific situation where it is (can be) predicted that there is no object that is about to enter the adjacent lane from the area outside of the host vehicle road. The specific situation is determined to be detected when:
- a first case is satisfied where the road-side object has been detected on the side of the adjacent lane; and/or
- a second case is satisfied where the white line has been detected on the side of the adjacent lane and no target object has been detected in the vicinity of the detected white line.

The present apparatus is configured to carry out the collision avoidance assist using the autonomous steering that lets the host vehicle enter the adjacent lane, at least when the collision avoidance space is determined to be present in the adjacent lane and the current situation is determined to be the specific situation.

In other words, a condition that is satisfied when at least both of a first condition described below and a second condition described below is met is employed as an execution permit/allowance condition for performing the collision avoidance steering control that lets/makes the host vehicle enter the adjacent lane to avoid the collision. The first condition is a condition that is satisfied when the collision avoidance space is determined to be present in the adjacent lane. The second condition is a condition that is satisfied when the current situation is determined to be the specific situation. The present apparatus is configured to carry out the collision avoidance steering control that lets the host vehicle enter the adjacent lane, when the above execution permit/allowance condition is satisfied and when the no target object approaching (coming closer to) the host vehicle from the area behind the host vehicle is determined to be present.

Therefore, in spite of the fact that the present apparatus employs, as the front direction sensor, only the front direction camera sensor 11 and the front direction radar sensor 12, the present apparatus can perform the collision avoidance assist with assuring the safety by making/letting the host vehicle deviate from the host vehicle lane and enter the adjacent lane. Consequently, the present apparatus remains as simple as the known typical collision avoidance assist apparatus, and can increase scenes where the collision avoidance assist using the autonomous steering is carried out. The present apparatus remains at the low cost.

Furthermore, according to the present apparatus, the collision avoidance steering control that lets/makes the host vehicle enter the adjacent lane is carried out, only when it is determined that there is no target object that is approaching the host vehicle from the area behind the host vehicle in the case where the current situation is determined to be the specific situation. Therefore, the collision avoidance control can be carried out more safely.

It should be noted that the rear right direction radar sensor 51R and rear left direction radar sensor 51L are used as the sensors for detecting the other vehicle approaching the host vehicle from the area behind the host vehicle, however, the radar sensors 51R, 51L are also used by the BSM system. Furthermore, the BSM system is the driver assist system widely employed by typical vehicles. Thus, having the radar sensors 51R, 51L may make the present apparatus neither expensive nor complicated.

The collision avoidance assist apparatus according to the present disclosure should not be limited to the above described embodiment, but rather various modifications are possible withing the object of the present disclosure.

For example, in the above embodiment, the current situation is determined to be the specific situation when either the first case described above or the second case described above is found, however, the current situation may be determined to be the specific situation when any only one of the first case and the second case is found.

In addition, the above embodiment may be configured to perform the collision avoidance assist using the autonomous brake when one of the following cases is found.

A case where it is determined that there is no collision avoidance space in the adjacent lane (S13: No).

A case where it is determined that the current situation is not the specific situation (S15, S16: No).

A case where it is determined that the other vehicle approaching the host vehicle from the area behind the host vehicle is present, even when it is determined that the current situation is the specific situation (S17: No).

What is claimed is:

1. A collision avoidance assist apparatus for a vehicle comprising:
   a front direction camera sensor configured to take a picture of a front direction camera detection area to obtain front direction camera sensor information, said front direction camera detection area being an area between a diagonally forward left direction of said vehicle and a diagonally forward right direction of said vehicle;
   a front direction radar sensor configured to obtain front direction radar sensor information on an object that is present in a front direction radar detection area, said front direction radar detection area being an area between a diagonally forward left direction of said vehicle and a diagonally forward right direction of said vehicle; and
   a control unit configured to:
      perform a collision avoidance steering control based on said front direction camera sensor information to move said vehicle to a collision avoidance space in order to avoid a collision between said vehicle and an obstacle, when it is determined, based on said front direction radar sensor information, that an object is present, as said obstacle, that is highly likely to collide with said vehicle;
      determine, based on said front direction camera sensor information and said front direction radar sensor information, whether or not a first condition is satisfied, said first condition being a condition that is satisfied when it is determined that there is a specific space as said collision avoidance space, said specific space overlapping with an adjacent lane that is adjacent to a host vehicle lane in which said vehicle is traveling;
      determine, based on surrounding information on an edge of a host vehicle road that is a road on which said host vehicle is traveling, said edge being located on an opposite side of said adjacent lane relative to said host vehicle lane, said surrounding information being included in said front direction camera sensor information and/or said front direction radar sensor information, whether or not a second condition is satisfied, said second condition being a condition that is satisfied when a current situation is a predetermined specific situation where it is predicted that there is no object that is about to enter said adjacent lane from an area outside of said host vehicle road; and
      perform said collision avoidance steering control to move said vehicle to said specific space when it is determined that an execution permit condition is satisfied, said execution permit condition being a condition that is satisfied when at least said first condition and said second condition are both determined to be satisfied.

2. The collision avoidance assist apparatus according to claim 1, wherein,
   said control unit is configured to determine that said current situation is said predetermined specific situation when it is determined, based on said surrounding information, that a road-side object that prevents a movable object from entering said adjacent lane from said area outside of said host vehicle road is present at said edge.

3. The collision avoidance assist apparatus according to claim 1, wherein, said control unit is configured to determine that said current situation is said predetermined specific situation when it is determined, based on said surrounding information, that a road marking line painted on said host vehicle road to define said adjacent lane is detected near said edge and that no object near said detected road marking line is detected.

4. The collision avoidance assist apparatus according to claim 2, wherein, said control unit is configured to determine that said current situation is said predetermined specific situation, when it is determined, based on said surrounding information, that a road marking line painted on said host vehicle road to define said adjacent lane is detected near said edge and that no object near said detected road marking line is detected, even when it is not determined that said road-side object is present near said edge.

5. The collision avoidance assist apparatus according to claim 1, further comprising a rear side direction radar sensor configured to detect a target object that is approaching said vehicle in said adjacent lane from an area behind said vehicle, and wherein, said control unit is configured to determine that said execution permit condition is satisfied; when a third condition in addition to said first condition and said second condition is satisfied, said third condition being a condition that is satisfied when said target object is not detected by said rear side direction radar sensor.

6. The collision avoidance assist apparatus according to claim 2, further comprising a rear side direction radar sensor configured to detect a target object that is approaching said vehicle in said adjacent lane from an area behind said vehicle, and wherein, said control unit is configured to determine that said execution permit condition is satisfied; when a third condition in addition to said first condition and said second condition is satisfied, said third condition being a condition that is satisfied when said target object is not detected by said rear side direction radar sensor.

7. The collision avoidance assist apparatus according to claim 3, further comprising a rear side direction radar sensor configured to detect a target object that is approaching said vehicle in said adjacent lane from an area behind said vehicle, and wherein, said control unit is configured to determine that said execution permit condition is satisfied when a third condition in addition to said first condition and said second condition is satisfied, said third condition being a condition that is satisfied when said target object is not detected by said rear side direction radar sensor.

8. The collision avoidance assist apparatus according to claim 4, further comprising a rear side direction radar sensor configured to detect a target object that is approaching said vehicle in said adjacent lane from an area behind said vehicle, and wherein, said control unit is configured to determine that said execution permit condition is satisfied; when a third condition in addition to said first condition and said second condition is satisfied, said third condition being a condition that is satisfied when said target object is not detected by said rear side direction radar sensor.

* * * * *